United States Patent
Rohr et al.

(10) Patent No.: US 7,029,818 B2
(45) Date of Patent: Apr. 18, 2006

(54) USE OF COATED PIGMENT GRANULES IN ELECTROPHOTOGRAPHIC TONERS AND DEVELOPERS, POWDER COATINGS AND INKJET INKS

(75) Inventors: Ulrike Rohr, Mannheim (DE); Ruediger Baur, Eppstein/Ts (DE); Hans-Joachim Metz, Darmstadt (DE); Andreas Stohr, Freinsheim (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 10/004,601

(22) Filed: Nov. 1, 2001

(65) Prior Publication Data

US 2002/0098435 A1 Jul. 25, 2002

(30) Foreign Application Priority Data

Nov. 2, 2000 (DE) ................ 100 54 344

(51) Int. Cl.
G03G 9/08 (2006.01)

(52) U.S. Cl. ............... 430/137.15; 430/137.2; 430/137.18

(58) Field of Classification Search ........... 430/104.23, 430/137.1, 108.8, 137.22, 137.2, 137.15
See application file for complete search history.

(56) References Cited

U.S. PATENT DOCUMENTS

| | | | |
|---|---|---|---|
| 1,651,733 A | 12/1927 | Sheppard et al. | |
| 3,652,602 A | 3/1972 | Schafer et al. | |
| 3,671,553 A | 6/1972 | Papenfuss et al. | |
| 3,773,535 A * | 11/1973 | Burgyan et al. | 106/434 |
| 4,173,492 A * | 11/1979 | Pollard | 106/415 |
| 4,912,006 A | 3/1990 | Breitschaft et al. | |
| 4,957,841 A | 9/1990 | Macholdt et al. | |
| 5,015,676 A | 5/1991 | Macholdt et al. | |
| 5,021,473 A | 6/1991 | Macholdt et al. | |
| 5,051,585 A | 9/1991 | Koshishiba et al. | |
| 5,069,994 A | 12/1991 | Gitzel et al. | |
| 5,137,576 A | 8/1992 | Macholdt et al. | |
| 5,147,748 A | 9/1992 | Gitzel et al. | |
| 5,252,378 A * | 10/1993 | Mehta et al. | 428/195 |
| 5,283,149 A * | 2/1994 | Tyagi et al. | 430/137.11 |
| 5,298,355 A * | 3/1994 | Tyagi et al. | 430/108.4 |
| 5,342,723 A | 8/1994 | Macholdt et al. | |
| 5,378,571 A | 1/1995 | Macholdt et al. | |
| 5,401,809 A | 3/1995 | Gitzel et al. | |
| 5,475,119 A | 12/1995 | Baur et al. | |
| 5,502,118 A | 3/1996 | Macholdt et al. | |
| 5,585,216 A | 12/1996 | Baur et al. | |
| 6,030,738 A | 2/2000 | Michel et al. | |
| 6,083,653 A | 7/2000 | Baur et al. | |
| 6,159,649 A * | 12/2000 | Macholdt et al. | 430/137.1 |
| 6,485,558 B1 * | 11/2002 | Metz et al. | 106/493 |

FOREIGN PATENT DOCUMENTS

| | | |
|---|---|---|
| DE | 1 644 619 | 7/1970 |
| DE | 1 919 724 | 11/1970 |
| DE | 40 29 652 | 3/1992 |
| DE | 40 31 705 | 4/1992 |
| DE | 41 42 541 | 6/1993 |
| DE | 43 32 170 | 3/1995 |
| DE | 44 18 842 | 12/1995 |
| DE | 197 11 260 | 9/1998 |
| DE | 197 32 995 | 2/1999 |
| EP | 0 258 651 | 3/1988 |
| EP | 0 347 695 | 12/1989 |
| EP | 0 359 123 | 3/1990 |
| EP | 0 362 703 | 4/1990 |
| EP | 0 385 580 | 9/1990 |
| EP | 0 516 434 | 12/1992 |
| EP | 0 636 945 | 2/1995 |
| EP | 0 778 501 | 6/1997 |
| EP | 1081195 A2 * | 3/2001 |

OTHER PUBLICATIONS

Diamond, Arthur S. (editor) Handbook of Imaging Materials. New York: Marcel-Dekker, Inc. (1991) pp. 162-171 & 193-197.*
Grant, Roger. Chemical Dictionary. New York: McGraw-Hill, Inc. (1987) p. 148.*
Diamond, Arthur S. (ed.) Handbook of Imaging Materials. New York: Marcel-Dekker, Inc. (1991) pp. 231-233.*
G.M. Sessler, et al., Electrets:, Topics in Applied Physics, vol. 33, Springer Verlag, New York, Heidelberg, 2nd Ed., 1987, title page and table of contents.
Von Tino Lippmann, et al., "Wirt-Girt-Komplexe zwischen von Resorcin abgeleiteten Calix [4] arenen und Alkylammonium-Ionen", Angew. Chem., 1993, 105, Nr. 8, p. 1258-1260.

(Continued)

Primary Examiner—Christopher Rodee
(74) Attorney, Agent, or Firm—Anthony A. Bisulca

(57) ABSTRACT

The present invention relates to the use of wax-coated pigment granules as colorants in electrophotographic toners and developers, powder coating materials, inkjet inks, electret fibers, and color filters, wherein the coated pigment granules have a particle size of between 0.05 and 5 mm and a wax content of from 1 to 50% by weight, based on the overall weight of the coated pigment granules.

17 Claims, No Drawings

OTHER PUBLICATIONS

Y. Higashiyama, et al., "The effect of an externally added charge control agent on contact charging between polymers", Journal of Electrostatics, 30 (1993), p. 203-212.

Hans-Tobias Macholdt, "Full color copying", Chimia, 48 (1994), p. 516-517.

Ullmann's Enzyklopadie der techischen Chemie, vol. 24, 4th edition, 1983, p. 1-49.

Handbook of Imaging Materials, 1991, Marcel Dekker, Inc., Chapter 6, Liquid Toner Technology, pp. 227-252.

Abstract for JP 03 168760, Oct. 22, 1991.

Abstract for JP 05 072818, Mar. 26, 1993.

Abstract for JP 10 251533, Sep. 22, 1998.

Visual and Colorimetric Evaluation of Pigments, 3rd edition, 1997, Nr. 1/1, p. 1-5.

Peter Gregory, "Topics in Applied Chemistry: High Technology Applications of Organic Colorants", Plenum Press, New York 1991, p. 15-25.

* cited by examiner

USE OF COATED PIGMENT GRANULES IN ELECTROPHOTOGRAPHIC TONERS AND DEVELOPERS, POWDER COATINGS AND INKJET INKS

BACKGROUND OF THE INVENTION

The present invention relates to the use of coated pigment granules in electrophotographic toners and developers, powder coating materials, and inkjet inks.

In electrophotographic recording processes a latent charge image is generated on a photoconductor. This latent charge image is developed by applying an electrostatically charged toner which is then transferred to, for example, paper, textiles, foils or plastic and is fixed by means, for example, of pressure, radiation, heat or the action of solvent. Typical toners are one- or two-component powder toners (also known as one- or two-component developers); also used are specialty toners, such as magnetic toners, liquid toners, latex toners, polymerization toners, and microencapsulated toners, based for example on wax.

SUMMARY OF THE INVENTION

One measure of the quality of a toner is its specific charge (q/m) (charge per unit mass). In addition to the sign and level of the electrostatic charge, the principal, decisive quality criteria are the rapid attainment of the desired charge level, and the constancy of this charge over an extended activation period. Another important criterion for the suitability of a toner is its insensitivity to climatic effects, such as temperature and atmospheric humidity.

Both positively and negatively chargeable toners are used in photocopiers, laser printers, LEDs (light emitting diodes), LCS (liquid crystal shutter) printers or other digital printers based on the electrophotographic principle, depending on the type of process and type of apparatus.

DETAILED DESCRIPTION OF THE INVENTION

In order to obtain electrophotographic toners or developers having either a positive or a negative charge, it is common to add charge control agents. As the coloring component in color toners, use is typically made of organic color pigments. As compared with dyes, color pigments have considerable advantages on account of their insolubility in the application medium, such as improved thermal stability and lightfastness, for example.

On the basis of the principle of subtractive color mixing it is possible, with the aid of the three primary colors yellow, cyan and magenta, to reproduce the entire spectrum of colors visible to the human eye. Exact color reproduction is possible only if the particular primary color satisfies the precisely defined coloristic requirements. If it is not the case, some shades cannot be reproduced, and the color contrast is inadequate.

In the case of full color toners, the three toners yellow, cyan and magenta must not only meet the precisely defined color requirements but must also be matched exactly to one another in terms of their triboelectric properties, since they are transferred one after the other in the same device.

6- and 7-color systems are likewise known. The base colors are red, green, blue, cyan, magenta, yellow, and black. It is also possible to produce full color prints by the Pantone Hexachrome® system with the colors cyan, magenta, yellow, black, orange and green.

It is known that colorants may have a long-term effect on the triboelectric charging of toners. As a result, it is normally not possible simply to add the colorants to a toner base formulation once prepared. It may instead be necessary to prepare a specific formulation for each colorant, with the nature and amount of the required charge control agent being tailored specifically. This approach is, correspondingly, laborious and in the case of color toners for process color is just another difficulty to add to those already described above.

Furthermore, it is important for practical use that the colorants possess high thermal stability and good dispersibility. Typical temperatures for incorporation of colorants into the toner resins are between 100° C. and 200° C. when using compounders or extruders. Accordingly, a thermal stability of 200° C., or better still 250° C., is of great advantage. It is also important that the thermal stability is maintained over a prolonged period (about 30 minutes) and in different binder systems. Typical toner binders are addition polymerization resins, polyaddition resins and polycondensation resins, such as styrene, styrene-acrylate, styrene-butadiene, acrylate, polyester, and phenol-epoxy resins, polysulfones, and polyurethanes, individually or in combination.

Besides the physical effect of the toner constituents with respect to coloristics and electrostatics, and an optimum dispersibility of the components, the quality of the toners is critically influenced by the preparation process.

The majority of toners are nowadays produced by blend processes, which break down into the component steps 1 to 4:

| Process steps | Objective | Problems |
| --- | --- | --- |
| 1. Initial mixing | Homongeneous premix | Dust, different Precursor particle size |
| 2. Dispersion | Homogeneous distribution | Inhomogeneities |
| 3. Grinding | Reduction in particle size | Yield, grindability |
| 4. Classifying | Setting of defined $d_{50}$ | Broad distribution |
| 5. Packaging | Free-flowability | Tackiness |

In addition to dispersion itself (step 2), initial mixing is of central significance. Typical initial components such as toner binders, charge control agents, and additives such as waxes and colorants are premixed in defined concentrations, in Henschel mixers or tumble mixers, for example. A disadvantage of existing processes is that the starting products exhibit (in some cases considerable) particle size differences (table 2) This leads frequently to metering problems and inhomogeneities, especially the greater the extent to which components having different particle sizes are used.

TABLE 2

Typical particle sizes of toner ingredients

| Component | Typical particle sizes |
| --- | --- |
| Binder | ~600 µm–800 µm |
| Pigment | <60 µm (agglomerates) |
| Charge control agent | <60 µm |
| Wax | ~20 µm–2000 µm |

The raw materials used often exhibit fluctuations of more than 1000 µm, resulting in inhomogeneities. Pregrinding of the premix is ruled out on grounds of cost. A reduction in the particle sizes of binders is possible only with additional expense, and increases the risk of electrostatic charging and hence of dust explosions. On performance grounds, increasing the particle sizes of pigments and charge control agents is neither possible nor sensible.

It is an object of the present invention to provide toner ingredients in such a form, and to process them to electrophotographic toners in such a way, that the abovementioned difficulties are overcome while at the same time influence is exerted advantageously on electrostatic and coloristic properties.

This object has surprisingly been achieved by incorporating the colorant, alone or in combination with a charge control agent, in the form of wax-coated pigment granules into the binder of the toner or powder coating material.

The invention provides for the use of wax-coated pigment granules as colorants in electrophotographic toners and developers, powder coating materials, inkjet inks, electret fibers, and color filters, wherein the coated pigment granules have a particle size of between 0.05 and 5 mm, preferably between 0.1 and 2 mm, and a wax content of from 1 to 50% by weight, preferably from 5 to 40% by weight, based on the overall weight of the coated pigment granules.

By this means, colorants are provided having particle sizes which are tailored to the particle sizes of the binder. A homogeneous premix of the colorant with the binder is therefore possible without undue technical expense.

The coated pigment granules used in accordance with the invention may be prepared by adding a wax to a pigment, for example, during the finish process in an organic or aqueous-organic medium, then removing the organic solvent, by steam distillation or washing with water, for example, and spray drying the resulting aqueous pigment suspension. In the course of this treatment, which is appropriately conducted during the pigment finish process, the pigment particles are brought into intimate contact with the wax. Following removal of the organic solvent, by steam distillation, for example, a sprayable aqueous pigment suspension is obtained. It may be appropriate to filter the suspension prior to spray drying, to remove any salt present by washing, and to reagitate the presscake obtained by filtration, to give a sprayable suspension. When washing is carried out with water, an appropriate procedure is to filter off the solid, wash it with water until free of solvent, and dilute the resultant presscake with water to give a sprayable suspension.

As a result of the spray drying process, granulation to an appropriate particle size is achieved without damage to the wax coating of the pigment particles that is obtained in the course of the solvent finish.

As a result of their generally spherical shape, the granules are free-flowing and hence readily meterable. Because of their size and weight, the granules produce very little dust.

Examples of suitable organic pigments include azo pigments, such as monoazo, disazo, Naphtol, and metal complex pigments, and also polycyclic pigments, such as isoindolinone and isoindoline pigments, anthanthrone, thioindigo, thiazineindigo, quinophthalone, anthraquinone, dioxazine, phthalocyanine, quinacridone, perylene, perinone, diketopyrrolopyrrole and azomethine pigments, or mixtures or mixed crystals of said pigments.

Preferred blue and/or green pigments are copper phthalocyanines, such as C.I. Pigment Blue 15, 15:1, 15:2, 15:3, 15:4, 15:6, 16 (metal-free phthalocyanine), or phthalocyanines with aluminum, nickel, iron or vanadium as the central atom, bridged phthalocyanine dimers/oligomers such as Si-bridged phthalocyanines, for example, and also triarylcarbonium pigments, such as Pigment Blue 1, 2, 9, 10, 14, 62, Pigment Green 1, 4, 45.

Preferred orange pigments are, for example, P.O. 5, 62, 36, 34, 13, 43, 71, 72.

Preferred yellow pigments are, for example, P.Y. 12, 13, 17, 83, 93, 97, 122, 155, 180, 174, 185.

Preferred red pigments are, for example, P.R. 48, 57, 122, 146, 147, 176, 184, 185, 186, 202, 207, 209, 238, 254, 255, 269, 270, 272.

Preferred violet pigments are, for example, P.V. 1, 19, 23.

Examples of mixed crystals are P.V.19/P.R.122 or P.R.146/147.

Suitable inorganic pigments include carbon blacks, $TiO_2$, iron oxides, pearlescent pigments, effect pigments, and metallic pigments.

The term "wax" refers to a number of natural or synthetic substances which as a general rule have the following properties: kneadable at 20° C., solid to brittly hard, coarse to finely crystalline, translucent to opaque, but not glassy; melting without decomposition above 40° C.; of relatively low viscosity and nonstringing even slightly above the melting point; of highly temperature-dependent consistency and solubility; polishable under gentle pressure (cf. Ullmanns Enzyklopädie der technischen Chemie, Volume 24, 4th Edition 1983, pp. 1–49, Verlag Chemie, Weinheim and Römpps Chemie-Lexikon, Volume 6, 8th Edition 1988, p. 463, Franck'sche Verlagshandlung).

Preferred waxes are the following: natural waxes, such as vegetable waxes, e.g., carnauba wax and candelilla wax, and animal waxes, e.g., beeswax, modified natural waxes, such as paraffin waxes, microwaxes, semisynthetic waxes, such as montan ester waxes, or fully synthetic waxes, such as polyolefin waxes, e.g., polyethylene and polypropylene waxes, polyethylene glycol waxes, cycloolefin copolymer waxes, amide waxes, such as N,N'-distearylethylenediamine, zirconocene waxes, and chlorinated or fluorinated polyolefin waxes or polyethylene/polytetrafluoroethylene wax mixtures.

Particular preference is given to polyolefin waxes and to polyolefin waxes containing polar groups, formed by subsequent oxidation of the polyolefin wax, by graft reaction with monomers containing carboxylic acid, carboxylic ester, carboxylic anhydride or hydroxyl groups, or by copolymerization of an olefin with a monomer containing carboxylic acid, carboxylic ester, carboxylic anhydride or hydroxyl groups.

For the purposes of the present invention, waxes may also be compounds of relatively high molecular weight which have a waxlike nature and have been prepared preferably by polycondensation, polyaddition or addition polymerization processes, examples being thermoplastic polyester resins, epoxy resins, styrene-acrylate copolymer resins, styrene-butadiene copolymer resins, and cycloolefin copolymer resins, such as ®Topas, for example. In order to possess sufficient solubility in organic solvents at elevated temperature, such polymers generally have a number-average molecular weight ($\overline{M}_n$) of from 500 up to 20,000. Preference is given to waxes having a number-average molecular weight ($\overline{M}_n$) of from 800 up to 10,000, particular preference to those having a number-average molecular weight ($\overline{M}_n$) of from 1000 up to 5000.

The dropping point of the waxes used in accordance with the invention, or the softening temperature of the waxlike polymers mentioned, is preferably within the range from 60 to 180° C., with particular preference in the range from 80 to 140° C.

The amount and the type of the wax may vary depending on the field of use of the pigment granules, particularly to ensure compatibility with the application medium. In order to generate a defined profile of properties it is also possible to use a mixture of at least two different waxes or polymers.

The pigment granules appropriately comprise the pigment in an amount of from 50 to 99% by weight, preferably from 60 to 95% by weight, and the wax in an amount of from 1 to 50% by weight, preferably from 5 to 40% by weight, based on the overall weight of the pigment granules.

A skilled worker understands that a finish process is an aftertreatment of the crude pigment ex-synthesis, which is usually in the form of a water-moist presscake, aqueous pigment suspension or dry pigment, in a finish medium—for example, in an organic solvent or in a mixture of water and organic solvent—in order to produce a crystal polymorph and/or crystal form which is advantageous for the subsequent application. Appropriately, a from 2 to 30% by weight suspension of the crude pigment or crude pigment presscake is stirred, kneaded and/or refluxed in the finish medium, with or without heating, and with the addition of the wax.

The finish medium is preferably an organic solvent, or mixture of water and an organic solvent, which is selected such that, at the finish temperature, it partly or fully dissolves the wax used and can be removed by steam distillation or washing. Preferred solvents are aliphatic alcohols, such as n-butanol, isobutanol, n-octanol, isooctanol; aromatic hydrocarbons, such as benzene, toluene, xylene, cresol, chlorobenzene, 1,2-dichlorobenzene; esters such as ethyl acetate, butyl acetate; ketones such as methyl ethyl ketone, methyl isobutyl ketone or cyclohexanone; and dipolar aprotic solvents such as N-methylpyrrolidone, dimethyl sulfoxide or sulfolane, for example.

The finish temperatures may be within the range, for example, of from 20 to 200° C., preferably from 60 to 180° C. The finish process lasts appropriately for from 1 to 24 hours, more preferably from 2 to 10 hours. It may be advantageous to conduct the finish process such that heating at from 60 to 200° C. is carried out for 1–10 hours, followed by cooling to from 100 to 20° C. and addition of the wax, followed in turn by heating again at from 60 to 200° C. It is also possible to add the wax to the finish batch directly—that is, without cooling in between—in the course of the finish process.

In the finish process, the usually lipophilic pigment is coated with the organic phase (solvent and wax). This procedure has the advantage that the pigment is in finely divided form in the organic phase. Final covering of the pigment surface with wax is achieved through the separation of the solvent, which takes place by steam distillation (temperature for example from 80 to 100° C.) or by washing with water on a filter, appropriately at from 20 to 95° C. At this point an aqueous suspension of wax-coated pigments is present. The suspension is adjusted to the desired concentration with water if desired, appropriately to give a 5 to 30% by weight suspension of the wax-coated pigment, with or without the aid of a colloid mill or a comparable unit, and is then spray dried to granules. In some cases, optimum wetting of the pigment surface with the wax may be favorably influenced by addition of a surfactant. Suitable surfactants include cationic surfactants, such as quaternary ammonium salts, long-chain alkylamines (in the neutral to weakly acidic pH range); anionic surfactants such as carboxylic acids, sulfonic acids, sulfo acid esters, such as sulfosuccinic esters, and salts thereof; amphosurfactants, such as betaines, and nonionic surfactants, such as sugar alkylates and acylates, ethoxylated sugar alkylates and acylates, glycerol esters, polyethylene glycol esters and ethoxylated fatty acids, fatty alcohol ethoxylates and fatty amine ethoxylates, for example.

In the preparation of the pigment granules, it is also possible together with the waxes to apply further additives, such as dyes or charge control agents, for example, to the pigment surface in order to effect tailoring to the respective application in the inkjet ink, toner or powder coating material. Thus, for example, a charge control agent may be added in dissolved or suspended form in the finish medium. This simplifies the toner preparation process and results in particularly homogeneous distribution of the charge control agent on the pigment surface.

Spray towers suitable for spray granulation are those with a single-fluid nozzle or those which effect buildup granulation (e.g., fluidized-bed spray driers (FSD)). In the case of single-fluid nozzle spray towers, the suspension is sprayed in the form of relatively large drops and the water is evaporated. Where the temperatures within the spray tower are above the dropping point of the wax, the wax melts and flows to form spherical granules with a smooth surface.

In the case of FSD spray towers, the suspension is sprayed to a fine powder. Vigorous fluidization in the fluidized bed, and the recirculation of the fine powder particles entrained by the outgoing air and deposited in an upstream cyclone, ensure that the spray drying takes place in a turbulent powder cloud. This gives rise to a dusting effect and, at tower temperatures above the dropping point of the wax, the particles stick together to give raspberrylike granules. The residual moisture and the granulometry are controlled in the fluidized bed. The gas entry temperature in the spray tower is normally in the range from 180 to 300° C., preferably from 190 to 280° C.; the gas exit temperature is in the range from 70 to 150° C., preferably from 90 to 130° C.

Besides their use in electrophotographic toners and developers, the coated pigment granules may also be used as colorants in powders and coating materials, especially in triboelectrically or electrokinetically sprayed powder coating materials such as are used to coat the surfaces of articles made, for example, of metal, wood, textile material, paper or rubber. The powder coating material or powder receives its electrostatic charge generally by one of the two following processes:

in the corona process, the powder coating material or powder, under guidance, passes a charged corona and in so doing becomes charged; in the triboelectric process, the principle of frictional electricity is utilized.

Typical powder coating resins employed are epoxy resins, carboxyl- and hydroxyl-containing polyester resins, polyurethane resins and acrylic resins, together with the customary curing agents. Resin combinations are also used. For example, epoxy resins are often used in combination with carboxyl- and hydroxyl-containing polyester resins.

Furthermore, the improved triboelectric behavior of the colorant may lead to an improvement in the electret properties in the case of colored (pigmented) electret materials, typical electret materials being based on polyolefins, halogenated polyolefins, polyacrylates, polyacrylonitriles, polystyrenes or fluoropolymers, examples being polyethylene, polypropylene, polytetrafluoroethylene and perfluorinated ethylene and propylene, or on polyesters, polycarbonates, polyamides, polyimides, polyether ketones, polyarylene sulfides, especially polyphenylene sulfides, polyacetals, cellulose esters, polyalkylene terephthalates, and mixtures thereof. The electret materials have numerous fields of use and may acquire their charge through corona charging or triboelectric charging (ref.: G. M. Sessler, "Electrets", Topics in Applied Physics, Vol. 33, Springer Verlag, N.Y., Heidelberg, 2nd Ed., 1987).

Furthermore, the improved triboelectric behavior of the colorant may lead to enhanced separation characteristics of colored (pigmented) polymers which are separated by electrostatic methods (Y. Higashiyau, J. of Electrostatics, 30, pages 203–212, 1993). Accordingly, the inherent triboelectric effect of pigments is important for the mass coloring of plastics as well. This inherent triboelectric effect is also significant in process/processing steps which entail intense frictional contact, such as spinning processes, film drawing processes or other shaping processes, for example.

Moreover, the coated pigment granules are also suitable for use as colorants for color filters, both for subtractive and for additive color generation (P. Gregory "Topics in Applied Chemistry: High Technology Application of Organic Colorants" Plenum Press, New York 1991, pp. 15–25), and also as colorants in electronic inks ("e-ink") for electronic newspapers. In electronic newspapers the print medium consists of two films between which there is a space occupied by particles which are colored on one half-side, which are selectively mobile and can be aligned by the application of external forces, such as electrical fields, in order to generate the printed image (Deutscher Drucker 13, pp. 28–32).

A task frequently encountered in connection with electrophotographic color toners, powder coating materials or inkjet inks is to shade the hue and to adapt it to the requirements of the specific application. Particularly appropriate for this purpose are other organic color pigments, inorganic pigments, and dyes.

Inorganic color pigments and/or dyes may be used in mixtures with the coated pigment granules in concentrations of between 0.01 and 50% by weight, preferably between 0.1 and 25% by weight, and with particular preference between 0.1% and 15% by weight, based on the overall weight of the coated pigment granules.

In this case the pigment granules are mixed with 1) pigments in the form of the powders or mixtures of powder pigments, 2) pigment presscakes or spray-dried presscakes (10–90% pigment content), 3) pigment concentrates in a solid or liquid carrier material, such as masterbatches, for example, 4) other pigment granules, or a combination thereof. Such mixtures may also be prepared, however, by dispersion (extrusion, kneading, roller bed processes, bead mills, Ultraturrax) in the presence of a carrier material in solid or liquid form (inks on an aqueous and nonaqueous basis) and also by flushing in the presence of a carrier material. Where the colorant is used with high water or solvent fractions (>5%), mixing may also take place in the presence of elevated temperatures with vacuum assistance.

Mixtures of organic dyes are particularly appropriate both for increasing the brightness and also for shading the hue. Preferred such organic dyes include the following:

water-soluble dyes, such as Direct, Reactive and Acid Dyes, and also solvent-soluble dyes, such as Solvent Dyes, Disperse Dyes, and Vat Dyes. Examples mentioned include: C.I. Reactive Yellow 37, Acid Yellow 23, Reactive Red 23, 180, C.I. Acid Red 1, 8, 52, 87, 94, 115, 131, 144, 152, 154, 186, 245; C.I. Direct Red 1, 11, 37, 62, 75, 81, 87, 89, 95, 227; Reactive Blue 19, 21, Acid Blue 9, Direct Blue 199, Solvent Yellow 14, 16, 25, 56, 62, 64, 79, 81, 82, 83, 83:1, 93, 98, 133, 162, 174, Solvent Red 8, 19, 24, 49, 89, 90, 91, 92, 109, 118, 119, 122, 124, 127, 135, 160, 195, 212, 215, Solvent Blue 44, 45, Solvent Orange 41, 60, 63, Disperse Yellow 64, Vat Red 41, Solvent Black 45, 27.

It is also possible to use dyes and pigments having fluorescent properties, such as ®Luminols (Riedel-de Haën), in concentrations of from 0.0001 to 10% by weight, preferably from 0.001 to 5% by weight, with very particular preference between 0.01 and 1%, based on the overall weight of the coated pigment granules, in order, for example, to produce forgeryproof toners.

Inorganic pigments, such as $TiO_2$ or $BaSO_4$, are used in mixtures for lightening. Also suitable are mixtures with effect pigments, such as pearlescent pigments, $Fe_2O_3$ pigments (®Paliocroms) and also pigments based on cholesteric polymers, which give rise to different colors depending on the viewing angle.

The pigment granules used in accordance with the invention may be combined with charge control agents providing either positive or negative control, in order to achieve a particular charging behavior. The use of positive and negative charge control agents simultaneously is a further option. The charge control agents and the pigment granules may be incorporated separately into the binder, or else the coated pigment granules comprise—as described above—the charge control agent.

Examples of suitable charge control agents are:

triphenylmethanes; ammonium and immonium compounds; iminium compounds; fluorinated ammonium and fluorinated immonium compounds; biscationic acid amides; polymeric ammonium compounds; diallylammonium compounds; aryl sulfide derivatives; phenol derivatives; phosphonium compounds and fluorinated phosphonium compounds; calix(n)arenes; resorcinols; cyclically linked oligosaccharides (cyclodextrins) and their derivatives, especially boron ester derivatives, interpolyelectrolyte complexes (IPECs); polyester salts; salt-like structured silicates, metal complex compounds, especially carboxylate-metal, salicylate-metal and salicylate-nonmetal complexes, aluminum azo complexes, $\alpha$-hydroxycarboxylic acid-metal and -nonmetal complexes; boron complexes of 1,2-dihydroxyaromatics, 1,2-dihydroxyaliphatics or 2-hydroxy-1-carboxyaromatics; benzimidazolones; azines, thiazines or oxazines which are listed in the Colour Index as Pigments, Solvent Dyes, Basic Dyes or Acid Dyes.

Examples of colored charge control agents which may be combined individually or in combination with one another with the pigment granules of the invention are:

triarylmethane derivatives such as, for example:

Colour Index Pigment Blue 1, 1:2, 2, 3, 8, 9, 9:1, 10, 10:1, 11, 12, 14, 18, 19, 24, 53, 56, 57, 58, 59, 61, 62, 67 or, for example, Colour Index Solvent Blue 2, 3, 4, 5, 6, 23, 43, 54, 66, 71, 72, 81, 124, 125, and also the triarylmethane compounds listed in the Colour Index under Acid Blue and Basic Dye, provided they are suitable in terms of their temperature stability and processing properties, such as Colour Index Basic Blue 1, 2, 5, 7, 8, 11, 15, 18, 20, 23, 26, 36, 55, 56, 77, 81, 83, 88, 89, Colour Index Basic Green 1, 3, 4, 9, 10, with Colour Index Solvent Blue 125, 66 and 124 being especially suitable.

Particularly suitable is Colour Index Solvent Blue 124 in the form of its highly crystalline sulfate or in the form of the trichlorotriphenylmethyl tetrachloroaluminate; metal complexes having the CAS numbers 84179-66-8 (chromium azo complex), 115706-73-5 (iron azo complex), 31714-55-3 (chromium azo complex), 84030-55-7 (chromium salicylate complex), 42405-40-3 (chromium salicylate complex), and also the quaternary ammonium compound CAS no.116810-46-9 and also aluminum azo complex dyes, metal carboxylates, and sulfonates.

Examples of charge control agents of the triphenylmethane series that are highly suitable for the production of electret fibers are the compounds described in DE-A-1 919 724 and DE-A-1 644 619.

Of particular interest are triphenylmethanes as described in U.S. Pat. No. 5,051,585, especially those of the formula (2)

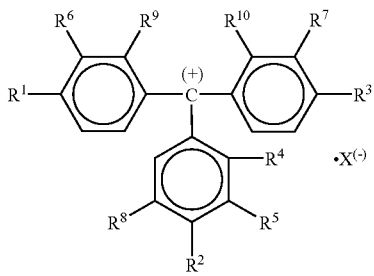

(2)

in which $R^1$ and $R^3$ are phenylamino groups, $R^2$ is a m-methylphenylamino group, and the radicals $R^4$ to $R^{10}$ are all hydrogen.

Also suitable are ammonium and immonium compounds, as described in U.S. Pat. No. 5,015,676, and also fluorinated ammonium and immonium compounds, as described in U.S. Pat. No. 5,069,994, especially those of the formula (3)

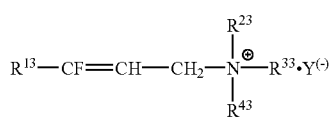

(3)

in which
$R^{13}$ is perfluorinated alkyl having from 5 to 11 carbon atoms,
$R^{23}$, $R^{33}$ and $R^{43}$ are identical or different and are alkyls having from 1 to 5, preferably from 1 to 2, carbon atoms, and
$Y^-$ is one stoichiometric equivalent of an anion, preferably of a tetrafluoroborate or tetraphenylborate anion.

Also suitable are biscationic acid amides, as described in WO 91/10172.

Suitability is possessed by diallylammonium compounds, as described in DE-A-4 142 541, and the polymeric ammonium compounds obtainable therefrom and of the formula (6), as described in DE-A-4 029 652 or DE-A4 103 610

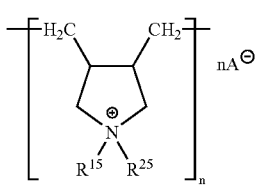

(6)

in which n has a value corresponding to molecular weights of from 5000 to 500,000 g/mol, preferably molecular weights of from 40,000 to 400,000 g/mol.

Also suitable are aryl sulfide derivatives, as described in DE-A-4 031 705, especially those of the formula (7)

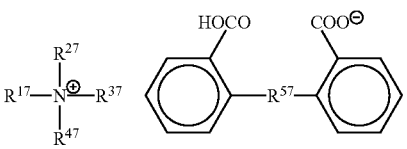

(7)

in which
$R^{17}$, $R^{27}$, $R^{37}$ and $R^{47}$ are identical or different alkyl groups having from 1 to 5, preferably 2 or 3, carbon atoms, and
$R^{57}$ is one of the divalent radicals —S—, —S—S—, —SO— or —SO$_2$—.

For example, $R^{17}$ to $R^{47}$ are propyl groups and $R^{57}$ is the group —S—S—.

Also suitable are phenol derivatives, as described in EP-A-0 258 651, especially those of the formula (8)

Further suitable compounds are phosphonium compounds and fluorinated phosphonium compounds, as described in U.S. Pat. No. 5,021,473 and in U.S. Pat. No. 5,147,748.

Also suitable are calix(n)arenes, as described in EP-A-0 385 580, EP-A-0 516 434, and Angew. Chemie (1993),195, 1258.

Also suitable are salt-like structured silicates, as described in the German patent application P 199 57 245.3, unpublished at the priority date of the present specification.

Suitability is also possessed by metal complex compounds, such as chromium, cobalt, iron, zinc or aluminum azo complexes or chromium, cobalt, iron, zinc or aluminum salicylic or boric acid complexes, of the formula (14)

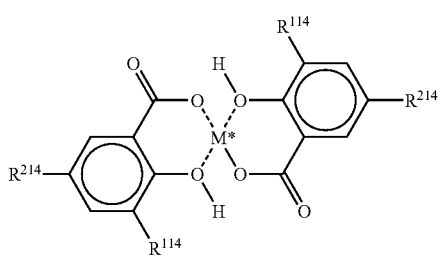

(14)

in which
$M^*$ is a divalent central metal atom, preferably a chromium, aluminum, iron, boron or zinc atom, and
$R^{114}$ and $R^{214}$ are identical or different, straight-chain or branched alkyl groups having from 1 to 8, preferably from 3 to 6, carbon atoms, an example being tert-butyl.

Suitability further extends to benzimidazolones, as described in EP-A-0 347 695.

Also suitable are cyclically linked oligosaccharides, as described in DE-A-4 418 842.

Also suitable are polymer salts, as described in DE-A-4 332 170, especially the product described in example 1 therein.

Also suitable are cyclooligosaccharide compounds, such as are described for example in DE-A-1971 1260, which are obtainable by reacting a cyclodextrin or cyclodextrin derivative with a compound of the formula

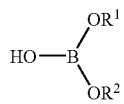

in which $R^1$ and $R^2$ are alkyl, preferably $C_1$–$C_4$ alkyl.

Also suitable are interpolyelectrolyte complexes, such as are described for example in DE-A-197 32 995. Particularly suitable in this context are compounds having a molar ratio of polymeric cationic groups to polymeric anionic groups of from 0.9:1.1 to 1.1:0.9.

Also suitable, especially in the case of use in liquid toners (Handbook of Imaging Materials, 1991, Marcel Dekker, Inc. Chapter 6, Liquid Toner Technology), are surface-active ionic compounds and so-called metal soaps.

Particularly suitable are alkylated arylsulfonates, such as barium petronates, calcium petronates, barium dinonylnaphthalenesulfonates (basic and neutral), calcium dinonylsulfonate or sodium dodecylbenzenesulfonate, and polyisobutylenesuccinimides (Chevron's ®Oloa 1200).

Also suitable are soya lecithin and N-vinylpyrrolidone polymers.

Also suitable are sodium salts of phosphated monoglycerides and diglycerides with saturated and unsaturated substituents, AB diblock copolymers of A: polymers of 2-(N,N)dimethylaminoethyl methacrylate quaternized with methyl p-toluenesulfonate, and B: poly-2-ethylhexyl methacrylate.

Also suitable, especially in liquid toners, are divalent and trivalent carboxylates, especially aluminum tristearate, barium stearate, chromium stearate, magnesium octoate, calcium stearate, iron naphthalite, and zinc naphthalite.

Chelating charge control agents, as described in EP 0 636 945 A1, metallic (ionic) compounds, as described in EP 0 778 501 A1, phosphate metal salts, as described in JA 9 (1997)-106107, azines of the following Colour Index numbers: C.I. Solvent Black 5, 5:1, 5:2, 7, 31 and 50; C.I. Pigment Black 1, C.I. Basic Red 2 and C.I. Basic Black 1 and 2, are also suitable.

The pigment granules used in accordance with the invention may contain from 0 to 49% by weight, preferably from 0.1 to 30% by weight, in particular from 1 to 20% by weight, based on the overall weight of the granules, of charge control agents.

Coated pigment granules of the invention and charge control agents may be combined by physical mixing or by addition of the charge control agent in the course of the coating process. Both components may also be added with advantage in the case of addition polymerization toners, where the binder is polymerized in the presence of the pigment granules and, where appropriate, of the charge control agent, or may be used in the preparation of liquid toners in high-boiling inert solvents, such as hydrocarbons. In another variant, it is also possible to use triboelectrically modified pigments, where the charge control agent has been added during the pigment synthesis and is part of the pigment (EP-A-0 359 123 and EP-A-0 362 703).

The pigment granules of the invention are also suitable for electrocoagulation toners on an aqueous basis.

The inventive use of coated pigment granules not only has technical process advantages in toner production but also has the effect of enhancing the charge behavior of the electrophotographic toner. Thus compared with a toner prepared by separate addition of pigment powder and wax to the binder, the pigment granules coated inventively with the same wax surprisingly exhibit a substantially improved charge constancy over the entire activation period.

The coated pigment granules used in accordance with the invention are homogeneously incorporated, by extrusion or kneading, for example, or added during its polymerization process, into the binder of the respective toner (liquid or dry), developer, powder coating material, electret material, or polymer for electrostatic separation, appropriately in a concentration of from 0.1 to 90% by weight, preferably from 0.5 to 40% by weight, with particular preference from 1 to 20% by weight, based on the overall mixture. Charge control agents are appropriately used in an amount (based on dry mass of the charge control agent) of from 0.1 to 20% by weight, preferably from 0.5 to 10% by weight, based on the overall weight of the toner, developer, powder coating material or electret material. In this context, the pigment granules and the abovementioned charge control agents, if not already contained in the pigment granules, may be used as dried and ground powders, dispersions and suspensions, in organic and/or inorganic solvents, for example, presscakes (which can be used, for example, for the so-called flushing process), spray-dried presscakes, or as a masterbatch, preparation, made-up paste, as a compound coated from aqueous or nonaqueous solution onto a suitable support, such as kieselguhr, $TiO_2$ or $Al_2O_3$, or in some other form.

The pigment granules may also be used in the form of pigment concentrate (masterbatch) in a carrier material, e.g., a polymer, with a pigment content of from 30 to 80% by weight.

The level of electrostatic charging of the electrophotographic toners or of the powder coating materials into which the pigment granules of the invention are homogeneously incorporated cannot be predicted and is measured in standard test systems under identical conditions (identical dispersion times, identical particle size distribution, identical particle morphology) at about 20° C. and 50% relative atmospheric humidity. The toner is electrostatically charged by being brought together turbulently on a roller bench (150 revolutions per minute) with a carrier, i.e., with a standardized friction partner (3 parts by weight of toner to 97 parts by weight of carrier). The electrostatic charge is then measured on a conventional q/m measurement setup.

The transparency and color strength in toner binder systems are investigated as follows: 30 parts by weight of the pigmented test toner are stirred using a dissolver (45 min at 3500 rpm) in 70 parts by weight of a base varnish (consisting of 15 parts by weight of the respective toner resin and 85 parts by weight of ethyl acetate). The test toner varnish produced in this way is applied using a Handcoater to suitable paper (e.g., Chromolux card) against a standard pigment varnish produced in the same way. A suitable size for the coater bar is, for example, K bar N 5 (=24 µm coat thickness). To allow better determination of the transparency, the paper has printed on it a black bar, and the transparency and color strength differences in dL values are determined in accordance with DIN 55 988, or evaluated in accordance with the test procedure Pigments Marketing, Clariant GmbH "Visuelle und Farbmetrische Bewertung von Pigmenten" [Visual and Colorimetric Evaluation of Pigments], Edition 3, 1996 (No. 1/1).

It has also been found that the coated pigment granules are suitable for use as colorants in inkjet inks on an aqueous basis (including microemulsion inks) and on a nonaqueous ("solvent-based") basis, and also in those inks which operate in accordance with the hotmelt process.

Microemulsion inks are based on organic solvents, water and, if desired, an additional hydrotropic substance (interface mediator). Inks on a nonaqueous basis include substantially organic solvents and, if desired, a hydrotropic substance.

The finished recording liquids generally contain from 0.5 to 30% by weight, preferably from 1.5 to 16% by weight, of the coated pigment granules, based on the overall weight of the recording liquid.

Microemulsion inks consist essentially of from 0.5 to 30% by weight, preferably from 1.5 to 16% by weight, of the coated pigment granules, from 5 to 99% by weight of water, and from 0.5 to 94.5% by weight of organic solvent and/or hydrotropic compound.

Solvent-based inkjet inks consist essentially of from 0.5 to 30% by weight of the coated pigment granules, and from 85 to 94.5% by weight of an organic solvent and/or hydrotropic compound. Carrier materials for solvent-based inkjet inks may be polyolefins, natural and synthetic rubber, polyvinyl chloride, vinyl chloride-vinyl acetate copolymers, polyvinyl butyrates, wax/latex systems, or combinations thereof, which are soluble in the solvent.

Hotmelt inks are based predominantly on organic compounds, such as waxes, fatty acids, fatty alcohols or sulfonamides, which are solid at room temperature and liquify on heating, the preferred melting range being between about 60 and about 140° C.

Hotmelt inkjet inks consist essentially of from 20 to 95% by weight of wax, from 1 to 20% by weight of the coated pigment granules, possibly shaded with further colorants, from 0 to 20% by weight of additional polymer (as "dye dissolver"), from 0 to 5% by weight of dispersing aid, from 0 to 20% by weight of viscosity modifiers, from 0 to 20% by weight of plasticizers, from 0 to 10% by weight of tack additive, from 0 to 10% by weight of transparency stabilizer (which prevents, for example, the crystallization of the waxes), and from 0 to 2% by weight of antioxidant.

The solvents present in the recording liquids described above may comprise an organic solvent or a mixture of such solvents. Examples of suitable solvents are monohydric or polyhydric alcohols, their ethers and esters, e.g., alkanols, especially those having from 1 to 4 carbon atoms, such as methanol, ethanol, propanol, isopropanol, butanol, isobutanol; dihyric or trihydric alcohols, especially those having from 2 to 5 carbon atoms, such as ethylene glycol, propylene glycol, 1,3-propanediol, 1,4-butanediol, 1,5-pentanediol, 1,6-hexanediol, 1,2,6-hexanetriol, glycerol, diethylene glycol, dipropylene glycol, triethylene glycol, polyethylene glycol, tripropylene glycol, polypropylene glycol; lower alkyl ethers of polyhydric alcohols, such as ethylene glycol monomethyl, monoethyl or monobutyl ether, triethylene glycol monomethyl or monoethyl ether; ketones and ketone alcohols such as acetone, methyl ethyl ketone, diethyl ketone, methyl isobutyl ketone, methyl pentyl ketone, cyclopentanone, cyclohexanone, diacetone alcohol; amides, such as dimethylformamide, dimethylacetamide, N-methylpyrrolidone, toluene, and n-hexane.

Water used to prepare the recording liquids is preferably employed in the form of distilled or deionized water.

As hydrotropic compounds, which may also serve as solvents if desired, use may be made for example of formamide, urea, tetramethylurea, ε-caprolactam, ethylene glycol, diethylene glycol, triethylene glycol, polyethylene glycol, butyl glycol, methyl cellosolve, glycerol, N-methylpyrrolidone, 1,3-diethyl-2-imidazolidinone, thiodiglycol, sodium benzenesulfonate, Na xylenesulfonate, Na toluenesulfonate, sodium cumenesulfonate, Na dodecylsulfonate, Na benzoate, Na salicylate or sodium butyl monoglycol sulfate.

The recording liquids may also include customary additives, examples being preservatives, cationic, anionic or nonionogenic surface-active substances (surfactants and wetting agents), and also viscosity regulators, e.g., polyvinyl alcohol, cellulose derivatives, or water-soluble natural or synthetic resins as film formers and/or binders for enhancing the adhesive strength and abrasion resistance.

Amines, such as ethanolamine, diethanolamine, triethanolamine, N,N-dimethylethanolamine or diisopropylamine, for example, serve primarily to raise the pH of the recording liquid. They are normally present in the recording liquid in amounts of from 0 to 10% by weight, preferably from 0.5 to 5% by weight.

EXAMPLES

In the examples below, parts are by weight.
Preparation examples for coated pigment granules:

Preparation Example 1

316 g of salt-free, water-moist presscakes of finished pigment P.Y. 180 (corresponding to 87.5 g of dry pigment) are dispersed in 335 g of water with the aid of a stirrer. Following the addition of 800 g of isobutanol and 37.5 g of a polyethylene wax (dropping point 103–108° C.; $M_n$ 1150), the mixture is stirred at 145° C. for 2 hours. During this time, the finish process takes place and the pigment is coated with wax. Following the finish, the isobutanol is removed by steam distillation to give an aqueous suspension of wax-coated pigment P.Y. 180.

The suspension is adjusted to a solids concentration of 10% by weight by addition of water, dispersed, and homogenized by passing it through a colloid mill. The homogeneous suspension is subsequently sprayed in an FSD spray tower, in the course of which it is granulated (gas entry temperature: 190° C.; gas exit temperature: 100° C.; bed temperature: 75° C.). This gives pigment granules having a raspberrylike structure.

Particle surface charging:

The electrokinetic particle surface is determined as described in Chimia 48 (1994) pages 516–517 and the literature cited therein. At a sample volume measured of 2 ml and a pigment concentration of 5 g/l, the corresponding pigment particle surface charge is obtained in mV/mg, the values being measured at the intrinsic pH of the substance sample:

| pH | mV/mg |
|---|---|
| 86.6 | |

Preparation Example 2

126.5 g of salt-free, water-moist presscakes of unfinished, crude pigment P.Y. 180 (corresponding to 41.73 g of dry pigment) are treated as described in preparation example 1 with 10.4 g of a polyethylene wax (dropping point 105–112° C., $M_n$ 1300).

The coloristic properties were tested in polyethylene and correspond to the powder type.

Particle surface charging:

The electrokinetic particle surface is determined as described in preparation example 1.

| pH | mV/mg |
|---|---|
| 79.1 | |

Preparation Example 3

137 g of salt-free, water-moist presscakes of unfinished, crude pigment P.Y. 180 (corresponding to 45 g of dry pigment) are dispersed in 390 g of water with the aid of a stirrer. Following the addition of 19 g of polyethylene wax (dropping point 114–118° C., $M_n$ 1100) and 19 g of a charge control agent (polyester salt from DE-A-43 32 170, example 1), the batch is stirred at 140° C. for 1 h and subjected to further processing as described in preparation example 1.

Application examples

Example 4

7 parts of pigment granules from preparation example 1 are incorporated homogeneously using a compounder into 93 parts of a toner binder (polyester resin based on Bisphenol A) over 100 minutes. The mixture is then ground on a laboratory universal mill, and subsequently classified on a centrifugal classifier.

In the following examples, measurement of the q/m values takes place on a conventional q/m measurement setup. The desired particle fraction (4–25 μm) from grinding is activated with a carrier consisting of silicone-coated ferrite particles with a size of from 50 to 200 μm. A screen with a mesh size of 2 μm is used to ensure that, when the toner is blown out, no carrier is ejected with it. The measurements are carried out at about 50% atmospheric humidity. As a function of the activation period, the following q/m values [μC/g] are measured:

| Activation period | q/m [μC/g] |
|---|---|
| 5 min. | −13 |
| 10 min. | −13 |
| 20 min. | −13 |
| 2 h | −11 |

Example 5

6.3 parts of the pigment granules from preparation example 2 are incorporated into 93.7 parts of a polyester resin based on Bisphenol A over 100 minutes, using a compounder, and the mixture is ground and classified.

| Activation period | q/m [μC/g] |
|---|---|
| 5 min. | −13 |
| 10 min. | −10 |
| 30 min. | −10 |
| 2 h | −10 |

Example 6

9.25 g of pigment granules from preparation example 3 are incorporated homogeneously using a compounder into 90.75 parts of a toner binder (polyester resin based on Bisphenol A) over 100 minutes, and the mixture is ground and classified.

| Activation period | q/m [μC/g] |
|---|---|
| 5 min. | −19 |
| 10 min. | −11 |
| 30 min. | −10 |
| 2 h | −10 |

Example 7

(Comparative Example): Uncoated Pigment Powder+Binder 5 parts of the powder product of P.Y. 180 are incorporated into 95 parts of a toner binder (polyester resin based on Bisphenol A) and the mixture is ground and classified.

| Activation period | q/m [μC/g] |
|---|---|
| 5 min. | −10 |
| 10 min. | −9 |
| 30 min. | −6 |
| 2 h | −3 |

Example 8

(Comparative Example): Uncoated Pigment Powder+Wax+Binder 1.24 parts of the polyethylene wax used in preparation example 2 are incorporated into 93.76 parts of a polyester resin based on Bisphenol A. Then 5 parts of a P.Y. 180 powder are incorporated homogeneously by kneading over 100 minutes. Grinding and classifying take place as described in example 4.

| Activation period | q/m [μC/g] |
|---|---|
| 5 min. | −12 |
| 10 min. | −10 |
| 30 min. | −8 |
| 2 h | −7 |

TABLE A

Overview of the measurements on the test toners of examples 4 to 8

|  | Ex. 4 | Ex. 5 | Ex. 6 | Ex. 7 (compar.) | Ex. 8 (compar.) |
|---|---|---|---|---|---|
| q/m (5 min) [µC/g] | −13 | −13 | −19 | −10 | 12 |
| q/m (10 min) [µC/g] | −13 | −13 | −11 | −9 | −10 |
| q/m (30 min) [µC/g] | −13 | −10 | −10 | −6 | −8 |
| q/m (2 h) [µC/g] | −11 | −10 | −10 | −3 | −6 |

The invention claimed is:

1. A method for coloring a composition comprising the steps of homogeneously incorporating spherically shaped wax-coated pigment granules into a binder resin, wherein the wax coated pigment granules have a particle size of between 0.05 and 5 mm and a wax content of from 1 to 50% by weight, based on the overall weight of the coated pigment granules to form a mixture, grinding the mixture and classifying the mixture to give a colored composition, wherein the wax coated pigment particles comprise an organic pigment, and wherein the organic pigment is an azo pigment or a polycyclic pigment, wherein the composition is an electrophotographic dry toner.

2. The method as claimed in claim 1, wherein the coated pigment granules have a wax content of from 5 to 40% by weight, based on the overall weight of the coated pigment granules.

3. The method as claimed in claim 1, wherein the polycyclic pigment is selected from the group consisting of an isoindolinone, isoindoline, anthanthrone, thioindigo, quinophthalone, anthraquinone, dioxazine, phthalocyanine, quinacridone, perylene, perinone, thiazineindigo, diketopyrrolopyrrole and azomethine pigment.

4. The method as claimed in claim 1, wherein the wax is selected from the group consisting of natural wax, modified natural wax, semisynthetic wax, fully synthetic wax, amide wax, chlorinated or fluorinated polyolefin wax, thermoplastic polyester resin, epoxy resin, stryene-acrylate copolymer resin, styrene-butadiene copolymer resin and cycloolefin copolymer resin.

5. The method as claimed in claim 4, wherein the fully synthetic wax is a polyolefin wax, a cycloolefin copolymer wax or a polyethylene glycol wax.

6. The method as claimed in claim 5, wherein the polyolefin wax is a polyolefin wax containing polar groups which has been formed by subsequent oxidation of the polyolefin wax, by graft reaction with monomers containing carboxylic acid, carboxylic ester, carboxylic anhydride or hydroxyl groups, or by copolymerization of an olefin and a monomer containing carboxylic acid, carboxylic ester, carboxylic anhydride or hydroxyl groups.

7. The method as claimed in claim 1, wherein the wax has a dropping point of between 60 and 180° C.

8. The method as claimed in claim 1, wherein the coated pigment granules are spray dried.

9. The method as claimed in claim 1, wherein the coated pigment granules further comprise a charge control agent selected from the group consisting of triphenylmethanes; ammonium and immonium compounds; iminium compounds; fluorinated ammonium compounds and fluorinated immonium compounds; biscationic acid amides; polymeric ammonium compounds; diallylammonium compounds; aryl sulfide derivatives; phenol derivatives; phosphonium compounds and fluorinated phosphonium compounds; salt-like structured silicates; calix(n)arenes; resorcinols; cyclically linked oligosaccharides, interpolyelectrolyte complexes; polyester salts; metal complex compounds; boron complexes of 1,2-dihydroxyaromatics, 1,2-dihydroxyaliphatics or 2-hydroxy-1-carboxyaromatics; benzimidiazolones; azines, thiazines, and oxazines.

10. The method as claimed in claim 9, wherein the charge control agent is present in the coated pigment granules in an amount of from 0.1 to 30% by weight, based on the overall weight of the coated pigment granules.

11. The method as claimed in claim 1, wherein the coated pigment granules are used in an amount of from 0.1 to 90% by weight, based on the overall weight of the composition.

12. The method as claimed in claim 1, wherein the coated pigment granules are in the form of a masterbatch.

13. The method as claimed in claim 1, wherein the wax has a dropping point of between 80 and 140° C.

14. The method as claimed in claim 1, wherein the coated pigment granules are used in an amount of from 0.5 to 40% by weight, based on the overall weight of the composition.

15. The method of claim 1, wherein the homogeneously incorporating step further comprises kneading the wax coated pigment granules into the binder resin.

16. The method of claim 1, wherein the homogeneously incorporating step further comprises extruding the binder resin and the wax coated pigment granules.

17. The method of claim 1, wherein the homogeneously incorporating step further comprises adding the coated pigment granules to the binder resin during polymerization of the binder resin.

* * * * *